United States Patent
Yun

(10) Patent No.: US 12,118,217 B2
(45) Date of Patent: Oct. 15, 2024

(54) MEMORY SYSTEM, MEMORY CONTROLLER AND METHOD FOR OPERATING MEMORY SYSTEM, CAPABLE OF DETERMINING TARGET META MEMORY BLOCK ON THE BASIS OF DETECTED TARGET STATE

(71) Applicant: SK hynix Inc., Icheon-si (KR)

(72) Inventor: Jang Hun Yun, Icheon (KR)

(73) Assignee: SK hynix Inc., Icheon-si (KR)

( * ) Notice: Subject to any disclaimer, the term of this patent is extended or adjusted under 35 U.S.C. 154(b) by 32 days.

(21) Appl. No.: 18/059,356

(22) Filed: Nov. 28, 2022

(65) Prior Publication Data

US 2024/0036741 A1    Feb. 1, 2024

(30) Foreign Application Priority Data

Jul. 28, 2022    (KR) ........................ 10-2022-0093562

(51) Int. Cl.
  *G06F 3/06*    (2006.01)
(52) U.S. Cl.
  CPC ............ *G06F 3/0619* (2013.01); *G06F 3/064* (2013.01); *G06F 3/0653* (2013.01); *G06F 3/0659* (2013.01); *G06F 3/0679* (2013.01)

(58) Field of Classification Search
  CPC ...... G06F 3/0619; G06F 3/064; G06F 3/0653; G06F 3/0659; G06F 3/0679
  See application file for complete search history.

(56) References Cited

U.S. PATENT DOCUMENTS

| | | | |
|---|---|---|---|
| 2020/0210295 A1* | 7/2020 | Lee | G06F 11/1458 |
| 2020/0264984 A1* | 8/2020 | Adams | G06F 12/1009 |
| 2021/0055988 A1* | 2/2021 | Kim | G06F 11/1068 |
| 2021/0103388 A1* | 4/2021 | Choi | G06F 11/1471 |
| 2021/0397496 A1 | 12/2021 | Elyasi et al. | |
| 2022/0229580 A1* | 7/2022 | Palmer | G06F 3/0653 |
| 2023/0108194 A1* | 4/2023 | Papandreou | G11C 16/3459 365/185.22 |

FOREIGN PATENT DOCUMENTS

KR    10-2009-0042035 A    4/2009

* cited by examiner

*Primary Examiner* — Jane W Benner

(57) ABSTRACT

In a memory system, one or more target meta memory blocks to which an entirety or a part of meta data is to be written are determined on the basis of a detected target state from among a plurality of target states. The one or more target meta memory block may be selected from among a plurality of meta memory blocks on the basis of a number of detected target states among the plurality of target states.

15 Claims, 12 Drawing Sheets

FIG.3
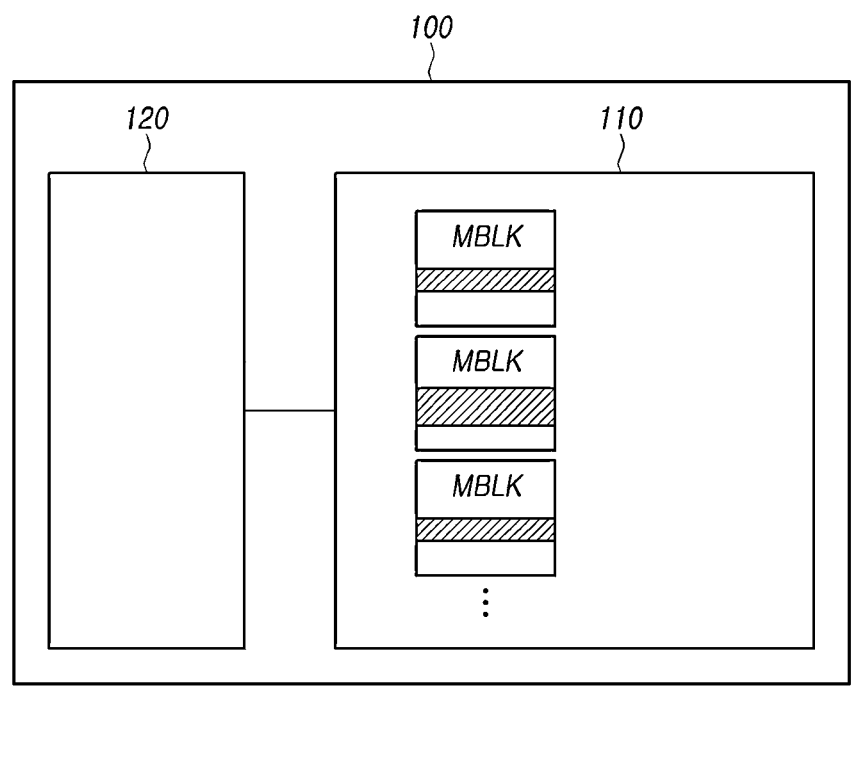
 meta data

MEMORY SYSTEM, MEMORY CONTROLLER AND METHOD FOR OPERATING MEMORY SYSTEM, CAPABLE OF DETERMINING TARGET META MEMORY BLOCK ON THE BASIS OF DETECTED TARGET STATE

CROSS-REFERENCE TO RELATED APPLICATION

The present application claims priority under 35 U.S.C. § 119(a) to Korean Patent Application No. 10-2022-0093562 filed on Jul. 28, 2022, which is incorporated herein by reference in its entirety.

BACKGROUND

1. Technical Field

Various embodiments generally relate to a memory system, a memory controller, and a method for operating a memory system, capable of determining a target meta memory block on the basis of a detected target state.

2. Related Art

A memory system includes a data storage device that stores data on the basis of a request from a host, such as a computer, server, smartphone, tablet PC, or other electronic device. Examples of memory systems span from a traditional magnetic-disk-based hard disk drive (HDD) to a semiconductor-based data storage device such as a solid state drive (SSD), a universal flash storage (UFS) device, or an embedded MMC (eMMC) device.

The memory system may further include a memory controller for controlling a memory device. The memory controller may receive a command from the host and, on the basis of the received command, may execute the command or control read, write, and/or erase operations on the memory devices in the memory system. The memory controller may be used to execute firmware operations for performing a logical operation for controlling such operations.

A memory system may write meta data, which is data for managing data stored in a memory device, to the memory device. If a problem occurs in the reliability of the meta data stored in the memory device, the memory system may malfunction.

SUMMARY

Various embodiments are directed to a memory system, a memory controller, and a method for operating a memory system, capable of stably managing meta data even in an environment in which an operation of a memory device is unstable.

In an embodiment, a memory system may include: i) a memory device including a plurality of meta memory blocks to which meta data is permitted to be written; and ii) a memory controller configured to determine, on the basis of detected target states among a plurality of target states, at least one of the plurality of meta memory blocks as a target meta memory block to which an entirety or a part of the meta data is to be written.

In an embodiment, a memory controller may include: i) a memory interface capable of communicating with a memory device including a plurality of meta memory blocks to which meta data is permitted to be written; and ii) a control circuit configured to determine, on the basis of detected target states among a plurality of target states, at least one of the plurality of meta memory blocks as a target meta memory block to which an entirety or a part of the meta data is to be written.

In an embodiment, a method for operating a memory system may include: determining a detected target state among a plurality of target states set in advance; and determining at least one target meta memory block to which entirety or a part of meta data is to be written, among a plurality of meta memory blocks to which the meta data is permitted to be written, on the basis of the detected target state.

According to the embodiments of the disclosed technology, it is possible to stably manage meta data even in an environment in which an operation of a memory device is unstable.

BRIEF DESCRIPTION OF THE DRAWINGS

FIG. 3 illustrates a schematic structure of a memory system according to an embodiment of the disclosed technology.

DETAILED DESCRIPTION

Figure 1:
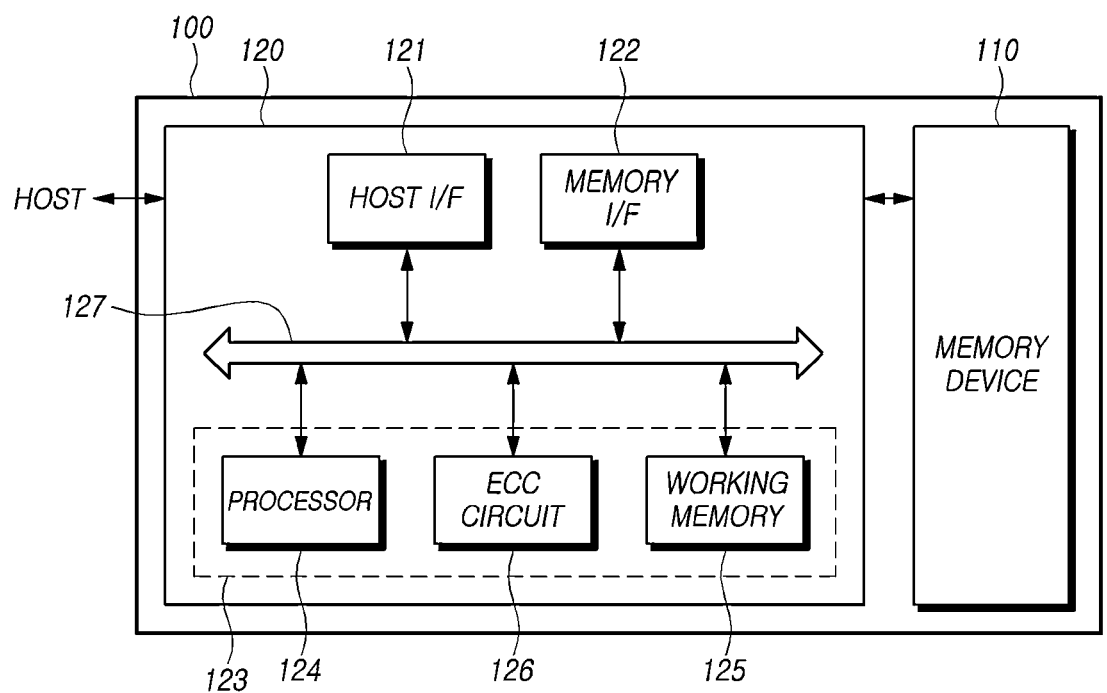
FIG. 1 illustrates a configuration of a memory system according to an embodiment of the disclosed technology.

Hereinafter, embodiments of the present disclosure are described in detail with reference to the accompanying drawings. Throughout the specification, reference to "an embodiment," "another embodiment" or the like is not necessarily to only one embodiment, and different references to any such phrase are not necessarily to the same embodiment(s). The term "embodiments" when used herein does not necessarily refer to all embodiments.

Various embodiments of the present invention are described below in more detail with reference to the accompanying drawings. However, the present invention may be embodied in different forms and variations, and should not be construed as being limited to the embodiments set forth herein. Rather, the described embodiments are provided so that this disclosure will be thorough and complete, and will fully convey the present invention to those skilled in the art to which this invention pertains. Throughout the disclosure, like reference numerals refer to like parts throughout the various figures and embodiments of the present invention.

The methods, processes, and/or operations described herein may be performed by code or instructions to be executed by a computer, processor, controller, or other signal processing device. The computer, processor, controller, or other signal processing device may be one described herein or one in addition to those described herein. Because the algorithms that form the basis of the processes (or operations of the computer, processor, controller, or other signal processing device) are described in detail, the code or instructions for implementing the operations of the method embodiments may transform the computer, processor, controller, or other signal processing device into a special-purpose processor for performing methods herein.

When implemented in at least partially in software, the controllers, processors, devices, modules, units, multiplexers, generators, logic, interfaces, decoders, drivers and other signal generating and signal processing features may include, for example, a memory or other storage device (that is, non-transitory computer-readable media) for storing code or instructions to be executed, for example, by a computer, processor, microprocessor, controller, or other signal processing device.

FIG. 1 illustrates the schematic configuration of a memory system 100 according to an embodiment of the disclosed technology.

In some implementations, the memory system 100 may include a memory device 110 configured to store data, and a memory controller 120 configured to control the memory device 110.

The memory device 110 may include multiple memory blocks each including a plurality of memory cells for storing data. The memory device 110 may be configured to operate in response to control signals received from the memory controller 120. Operations of the memory device 110 may include, for example, a read operation, a program operation (also referred to as a "write operation"), an erasure operation, and the like.

The memory cells in the memory device 110 are used to store data and may be arranged in a memory cell array. The memory cell array may be divided into memory blocks of memory cells and each block includes different pages of memory cells. In typical implementations of NAND flash memory devices, a page of memory cells is the smallest memory unit that can be programmed or written, and the data stored in memory cells can be erased at the block level.

In some implementations, the memory device 110 may be implemented as various types, such as a double data rate synchronous dynamic random access memory (DDR SDRAM), a low power double data rate4 (LPDDR4) SDRAM, a graphics double data rate (GDDR) SDRAM, a low power DDR (LPDDR), a Rambus dynamic random access memory (RDRAM), a NAND flash memory, a vertical NAND flash memory, a NOR flash memory, a resistive random access memory (RRAM), a phase-change random access memory (PRAM), a magnetoresistive random access memory (MRAM), a ferroelectric random access memory (FRAM), or a spin transfer torque random access memory (STT-RAM).

The memory device 110 may be implemented in a three-dimensional array structure. Some embodiments of the disclosed technology are applicable to any type of flash memory devices having an electric charge storage layer. In an implementation, the electric charge storage layer may be formed of a conductive material, and such an electric charge storage layer can be called a floating gate. In another implementation, the electric charge storage layer may be formed of an insulating material, and such a flash memory device can be called a charge trap flash (CTF).

The memory device 110 may be configured to receive a command and an address from the memory controller 120 to access an area of the memory cell array selected using the address. That is, the memory device 110 may perform an operation corresponding to the received command on a memory area of the memory device having a physical address corresponding to the received address from the memory controller 120.

In some implementations, the memory device 110 may perform a program operation, a read operation, an erasure operation, and the like. During the program operation, the memory device 110 may write data in the area selected by the address. During the read operation, the memory device 110 may read data from a memory area selected by the address. During the erasure operation, the memory device 110 may erase data stored in a memory area selected by the address.

The memory controller 120 may control write (program), read, erasure, and background operations that are performed on the memory device 110. The background operation may include, for example, operations that are implemented to optimize the overall performance of the memory device 110, such as a garbage collection (GC) operation, a wear leveling (WL) operation, and a bad block management (BBM) operation.

The memory controller 120 may control the operation of the memory device 110 at the request of a host. Alternatively, the memory controller 120 may control the operation of the memory device 110 even in absence of request from the host when it performs such background operations of the memory device.

The memory controller 120 and the host may be separate devices. In some implementations, the memory controller 120 and the host may be integrated and implemented as a single device. In the following description, the memory controller 120 and the host will be discussed as separate devices as an example.

Referring to FIG. 1, the memory controller 120 may include a memory interface (memory I/F) 122, a control circuit 123, and a host interface (host I/F) 121.

The host interface 121 may be configured to provide an interface for communication with the host.

When receiving a command from the host HOST, the control circuit 123 may receive the command through the host interface 121 and may perform an operation of processing the received command.

The memory interface 122 may be directly or indirectly connected to the memory device 110 to provide an interface for communication with the memory device 110. That is, the memory interface 122 may be configured to provide the memory device 110 and the memory controller 120 with an interface for the memory controller 120 to perform memory operations on the memory device 110 based on control signals and instructions from the control circuit 123.

The control circuit 123 may be configured to control the operation of the memory device 110 through the memory controller 120. For example, the control circuit 123 may include a processor 124 and a working memory 125. The control circuit 123 may further include an error detection/correction circuit (ECC circuit) 126 and the like.

The processor 124 may control the overall operation of the memory controller 120. The processor 124 may perform a logical operation. The processor 124 may communicate with the host HOST through the host interface 121. The processor 124 may communicate with the memory device 110 through the memory interface 122.

The processor 124 may be used to perform operations associated with a flash translation layer (FTL) to effectively manage the memory operations on the memory system 100. The processor 124 may translate a logical block address (LBA) provided by the host into a physical block address (PBA) through the FTL. The FTL may receive the LBA and translate the LBA into the PBA by using a mapping table.

There are various address mapping methods which may be employed by the FTL, based on the mapping unit. Typical address mapping methods may include a page mapping method, a block mapping method, and a hybrid mapping method.

The processor 124 may be configured to randomize data received from the host to write the randomized data to the memory cell array. For example, the processor 124 may randomize data received from the host by using a randomizing seed. The randomized data is provided to the memory device 110 and written to the memory cell array.

The processor 124 may be configured to derandomize data received from the memory device 110 during a read operation. For example, the processor 124 may derandomize data received from the memory device 110 by using a derandomizing seed. The derandomized data may be output to the host HOST.

The processor 124 may execute firmware (FW) to control the operation of the memory controller 120. In other words, the processor 124 may control the overall operation of the memory controller 120 and, in order to perform a logical operation, may execute (drive) firmware loaded into the working memory 125 during booting.

The firmware refers to a program or software stored on a certain nonvolatile memory and is executed inside the memory system 100.

In some implementations, the firmware may include various functional layers. For example, the firmware may include at least one of a flash translation layer (FTL) configured to translate a logical address in the host HOST requests to a physical address of the memory device 110, a host interface layer (HIL) configured to interpret a command that the host HOST issues to a data storage device such as the memory system 100 and to deliver the command to the FTL, and a flash interface layer (FIL) configured to deliver a command issued by the FTL to the memory device 110.

For example, the firmware may be stored in the memory device 110, and then loaded into the working memory 125.

The working memory 125 may store firmware, program codes, commands, or pieces of data necessary to operate the memory controller 120. The working memory 125 may include, for example, at least one among a static RAM (SRAM), a dynamic RAM (DRAM), and a synchronous RAM (SDRAM) as a volatile memory.

The error detection/correction circuit 126 may be configured to detect and correct one or more erroneous bits in the data by using an error detection and correction code. In some implementations, the data that is subject to the error detection and correction may include data stored in the working memory 125, and data retrieved from the memory device 110.

The error detection/correction circuit 126 may be implemented to decode data by using the error correction code. The error detection/correction circuit 126 may be implemented by using various decoding schemes. For example, a decoder that performs nonsystematic code decoding or a decoder that performs systematic code decoding may be used.

In some implementations, the error detection/correction circuit 126 may detect one or more erroneous bits on a sector basis. That is, each piece of read data may include multiple sectors. In this patent document, a sector may refer to a data unit that is smaller than the read unit (e.g., page) of a flash memory. Sectors constituting each piece of read data may be mapped based on addresses.

In some implementations, the error detection/correction circuit 126 may calculate a bit error rate (BER) and determine whether the number of erroneous bits in the data is within the error correction capability sector by sector. For example, if the BER is higher than a reference value, the error detection/correction circuit 126 may determine that the erroneous bits in the corresponding sector are uncorrectable and the corresponding sector is marked "fail." If the BER is lower than or equals to the reference value, the error detection/correction circuit 126 may determine that the corresponding sector is correctable or the corresponding sector can be marked "pass."

The error detection/correction circuit 126 may perform error detection and correction operations successively on all read data. When a sector included in the read data is correctable, the error detection/correction circuit 126 may move on to the next sector to check as to whether an error correction operation is needed on the next sector. Upon completion of the error detection and correction operations on all the read data in this manner, the error detection/correction circuit 126 may acquire information as to which sector is deemed uncorrectable in the read data. The error detection/correction circuit 126 may provide such information (e.g., address of uncorrectable bits) to the processor 124.

The memory system 100 may also include a bus 127 to provide a channel between the constituent elements 121, 122, 124, 125, and 126 of the memory controller 120. The bus 127 may include, for example, a control bus for delivering various types of control signals and commands, and a data bus for delivering various types of data.

By way of example, FIG. 1 illustrates the above-mentioned constituent elements 121, 122, 124, 125, and 126 of the memory controller 120. It is noted that some of those illustrated in the drawings may be omitted, or some of the above-mentioned constituent elements 121, 122, 124, 125, and 126 of the memory controller 120 may be integrated into a single element. In addition, in some implementations, one or more other constituent elements may be added to the above-mentioned constituent elements of the memory controller 120.

Figure 2:
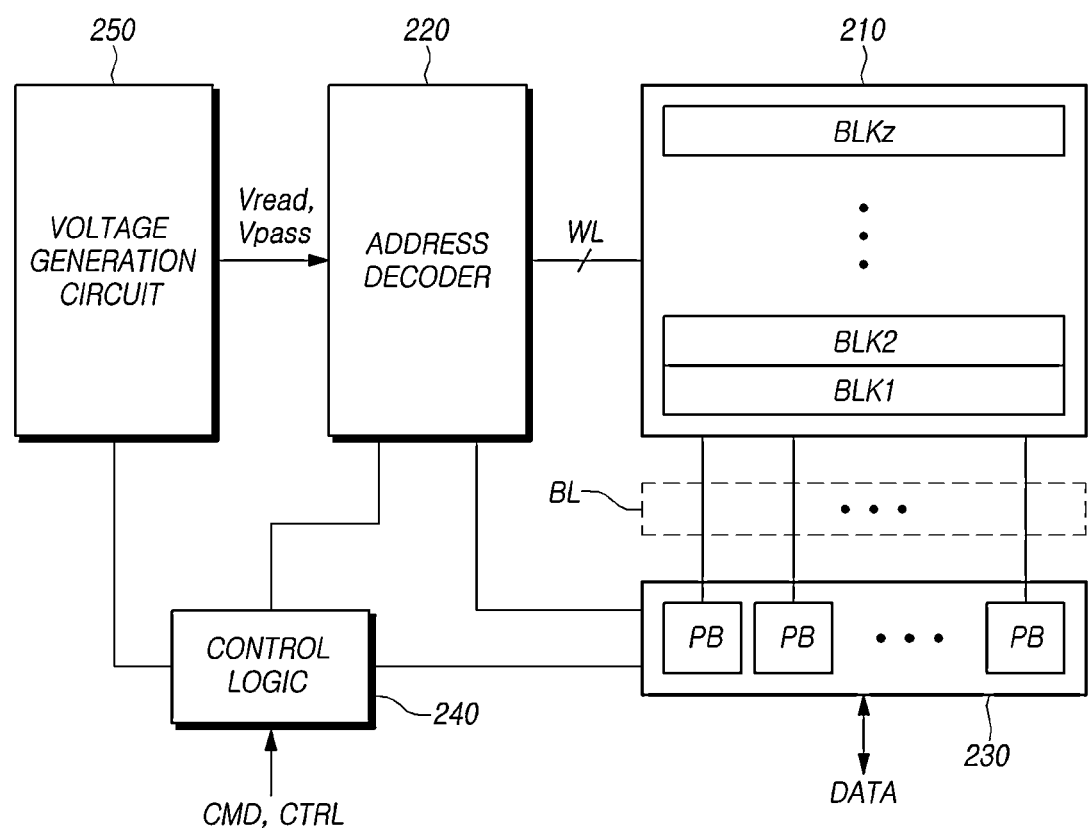
FIG. 2 schematically illustrates a memory device according to an embodiment of the disclosed technology.

FIG. 2 is a block diagram schematically illustrating a memory device 110 according to embodiment of the disclosed technology.

In some implementations, the memory device 110 may include a memory cell array 210, an address decoder 220, a read/write circuit 230, control logic 240, and a voltage generation circuit 250.

The memory cell array 210 may include multiple memory blocks BLK1-BLKz, where z is a natural number equal to or larger than 2.

In the multiple memory blocks BLK1-BLKz, multiple word lines WL and multiple bit lines BL may be disposed in rows and columns, and multiple memory cells may be arranged.

The multiple memory blocks BLK1-BLKz may be connected to the address decoder 220 through the multiple word lines WL. The multiple memory blocks BLK1-BLKz may be connected to the read/write circuit 230 through the multiple bit lines BL.

Each of the multiple memory blocks BLK1-BLKz may include multiple memory cells. In some implementations, the multiple memory cells are nonvolatile memory cells. In some implementations, such nonvolatile memory cells may be arranged in a vertical channel structure.

The memory cell array 210 may be configured as a memory cell array having a two-dimensional structure. In some implementations, the memory cell array 210 may be arranged in a three-dimensional structure.

Each of the multiple memory cells included in the memory cell array 210 may store at least one bit of data. For example, each of the multiple memory cells included in the memory cell array 210 may be a single-level cell (SLC) configured to store one bit of data. As another example, each of the multiple memory cells included in the memory cell array 210 may be a multi-level cell (MLC) configured to store two bits of data per memory cell. As another example, each of the multiple memory cells included in the memory cell array 210 may be a triple-level cell (TLC) configured to store three bits of data per memory cell. As another example, each of the multiple memory cells included in the memory cell array 210 may be a quad-level cell (QLC) configured to store four bits of data per memory cell. As another example, the memory cell array 210 may include multiple memory cells, each of which may be configured to store at least five bits of data per memory cell.

Referring to FIG. 2, the address decoder 220, the read/write circuit 230, the control logic 240, and the voltage generation circuit 250 may operate as peripheral circuits configured to drive the memory cell array 210.

The address decoder 220 may be connected to the memory cell array 210 through the multiple word lines WL.

The address decoder 220 may be configured to operate in response to command and control signals of the control logic 240.

The address decoder 220 may receive addresses through an input/output buffer inside the memory device 110. The address decoder 220 may be configured to decode a block address among the received addresses. The address decoder 220 may select at least one memory block based on the decoded block address.

The address decoder 220 may receive a read voltage Vread and a pass voltage Vpass from the voltage generation circuit 250.

The address decoder 220 may, during a read operation, apply the read voltage Vread to a selected word line WL inside a selected memory block and apply the pass voltage Vpass to the remaining non-selected word lines WL.

The address decoder 220 may apply a verification voltage generated by the voltage generation circuit 250 to a selected word line WL inside a selected memory block, during a program verification operation, and may apply the pass voltage Vpass to the remaining non-selected word lines WL.

The address decoder 220 may be configured to decode a column address among the received addresses. The address decoder 220 may transmit the decoded column address to the read/write circuit 230.

The memory device 110 may perform the read operation and the program operation page by page. Addresses received when the read operation and the program operation are requested may include at least one of a block address, a row address, and a column address.

The address decoder 220 may select one memory block and one word line based on the block address and the row address. The column address may be decoded by the address decoder 220 and provided to the read/write circuit 230.

The address decoder 220 may include at least one of a block decoder, a row decoder, a column decoder, and an address buffer.

The read/write circuit 230 may include multiple page buffers PB. The read/write circuit 230 may operate as a "read circuit" when the memory cell array 210 performs a read operation, and may operate as a "write circuit" when the memory cell array 210 performs a write operation.

The above-mentioned read/write circuit 230 is also referred to as a page buffer circuit including multiple page buffers PB, or a data register circuit. The read/write circuit 230 may include a data buffer that participates in a data processing function and, in some implementations, may further include a cache buffer for data caching.

The multiple page buffers PB may be connected to the memory cell array 210 through the multiple bit lines BL. In order to detect or sense the threshold voltage Vth of the memory cells during a read operation and a program verification operation, the multiple page buffers PB may continuously supply a sensing current to the bit lines BL connected to the memory cells to detect, at a sensing node, a change proportional to the amount of current that varies depending on the program state of a corresponding memory cell, and may hold or latch the corresponding voltage as sensing data.

The read/write circuit 230 may operate in response to page buffer control signals output from the control logic 240.

During a read operation, the read/write circuit 230 senses a voltage value of a memory cell and the voltage value is read out as data. The read/write circuit 230 temporarily stores the retrieved data, and outputs the data DATA to the input/output buffer of the memory device 110. In an embodiment, the read/write circuit 230 may include a column selection circuit, in addition to the page buffers PB or page registers.

The control logic 240 may be connected to the address decoder 220, the read/write circuit 230, and the voltage generation circuit 250. The control logic 240 may receive a command CMD and a control signal CTRL through the input/output buffer of the memory device 110.

The control logic 240 may be configured to control the overall operation of the memory device 110 in response to the control signal CTRL. The control logic 240 may output a control signal for adjusting the voltage level of sensing nodes of multiple page buffers PB to a pre-charge voltage level.

The control logic 240 may control the read/write circuit 230 to perform a read operation in the memory cell array 210. The voltage generation circuit 250 may generate a read voltage Vread and a pass voltage Vpass, which are used during the read operation, in response to a voltage generation circuit control signal output from the control logic 240.

A memory block of the multiple memory blocks BLK1-BLKz included in the memory device 110 may include multiple pages. In some implementations, a plurality of memory cells arranged in columns form memory cell strings, and a plurality of memory cells arranged in rows form memory blocks. Each of the multiple pages is coupled to one of word lines WL, and each of the memory cell strings STR is coupled to one of bit lines BL.

In the memory block, multiple word lines WL and multiple bit lines BL may be arranged in rows and columns. For example, each of the multiple word lines WL may be arranged in the row direction, and each of the multiple bit lines BL may be arranged in the column direction. As another example, each of the multiple word lines WL may be arranged in the column direction, and each of the multiple bit lines BL may be arranged in the row direction.

In some implementations, the multiple word lines WL and the multiple bit lines BL may intersect with each other, thereby addressing a single memory cell in the array of multiple memory cells. In some implementations, each memory cell may include a transistor that includes a material layer that can hold an electrical charge.

For example, the transistor arranged in each memory cell may include a drain, a source, and a gate. The drain (or source) of the transistor may be connected to the corresponding bit line BL directly or via another transistor. The source (or drain) of the transistor may be connected to the source line (which may be the ground) directly or via another transistor. The gate of the transistor may include a floating gate (FG) surrounded by an insulator, and a control gate (CG) to which a gate voltage is applied from a word line WL.

In each of the multiple memory blocks BLK1-BLKz, a first selection line (also referred to as a source selection line or a drain selection line) may be additionally arranged outside the first outermost word line, which is closer to the read/write circuit 230 among two outermost word lines, and a second selection line (also referred to as a drain selection line or a source selection line) may be additionally arranged outside the other second outermost word line.

In some implementations, at least one dummy word line may be additionally arranged between the first outermost word line and the first selection line. In addition, at least one dummy word line may be additionally arranged between the second outermost word line and the second selection line.

A read operation and a program operation (write operation) of the memory block may be performed page by page, and an erasure operation may be performed memory block by memory block.

FIG. 3 illustrates a schematic structure of a memory system 100 according to an embodiment of the disclosed technology.

Referring to FIG. 3, the memory system 100 may include a memory device 110 and a memory controller 120.

The memory device 110 may include a plurality of meta memory blocks MBLK.

A meta memory block is a memory block to which meta data may be written. For example, each of the plurality of meta memory blocks MBLK may be each of the plurality of memory blocks BLK1 to BLKz described above with reference to FIG. 2 or a super memory block including at least one of the plurality of memory blocks BLK1 to BLKz.

The memory controller 120 may use meta data stored in the plurality of meta memory blocks MBLK to operate the above-described flash translation layer (FTL).

In the embodiment of the disclosed technology, the memory controller 120 may determine at least one target meta memory block among the plurality of meta memory blocks MBLK included in the memory device 110. Hereinafter, this will be described in detail with reference to FIG. 4.

Figure 4:
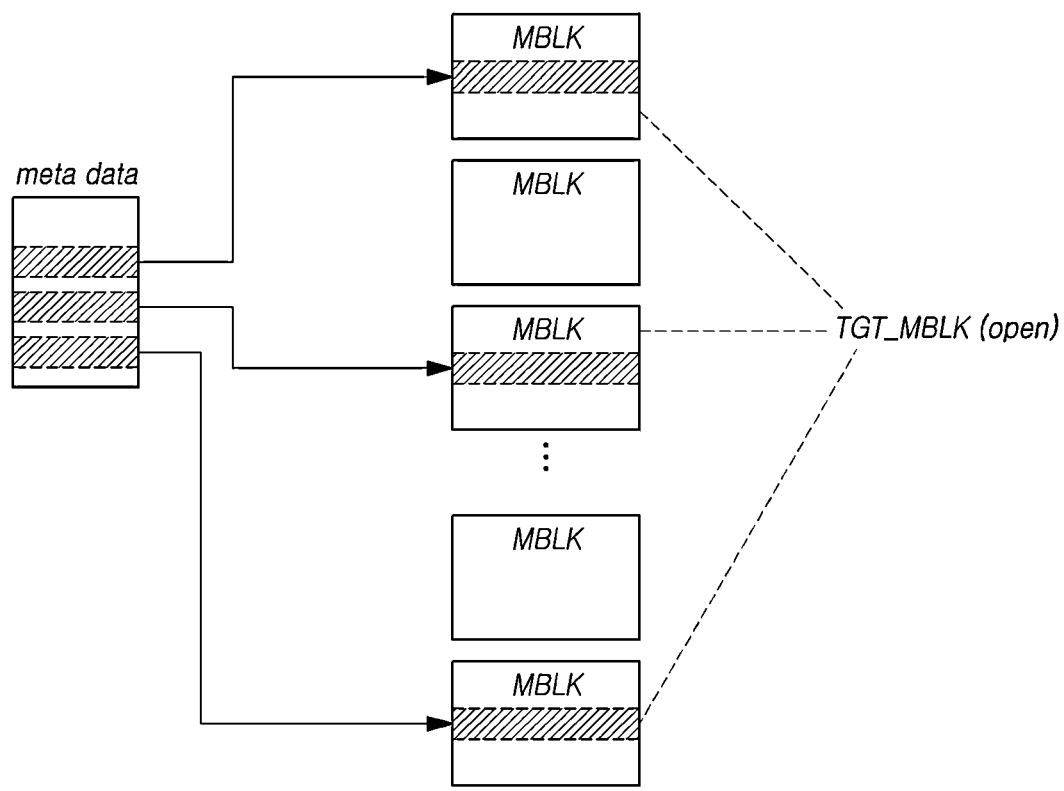
FIG. 4 illustrates an example of target meta memory blocks according to an embodiment of the disclosed technology.

FIG. 4 illustrates an example of target meta memory blocks TGT_MBLK according to an embodiment of the disclosed technology.

Referring to FIG. 4, the memory controller 120 of the memory system 100 may determine one or more of the plurality of meta memory blocks MBLK as target meta memory blocks TGT_MBLK.

Each target meta memory block TGT_MBLK is a meta memory block to which the entirety or a part of meta data is to be written. Additionally, each target meta memory block TGT_MBLK is an open memory block to which new meta data may be written.

The memory controller 120 writes the entirety or a part of meta data only to the target meta memory blocks TGT_MBLK among the plurality of meta memory blocks MBLK. Accordingly, new meta data is no longer written to meta memory blocks MBLK which are not determined as the target meta memory blocks TGT_MBLK among the plurality of meta memory blocks MBLK.

Hereinafter, a detailed method for the memory system 100 to determine the target meta memory blocks TGT_MBLK based on an embodiment of the disclosed technology will be described.

Figure 5:
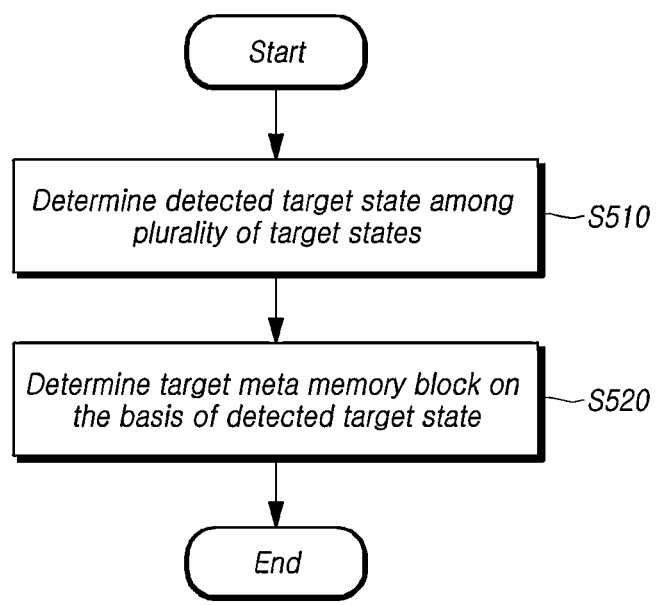
FIG. 5 is a flowchart of an operation of a memory system based on an embodiment of the disclosed technology.

FIG. 5 is a flowchart illustrating an example of an operation of the memory system 100 based on an embodiment of the disclosed technology.

Referring to FIG. 5, the memory controller 120 of the memory system 100 may determine a detected target state among a plurality of target states set in advance (S510).

The memory device 110 may operate unstably due to various causes such as an ambient temperature, power, or characteristics of memory cells. If an error occurs in meta data stored in the memory device 110 due to the unstable operation of the memory device 110, firmware may malfunction and a fatal influence may be exerted on the memory system 100.

The plurality of target states are states indicating that the operation of the memory device 110 of the memory system 100 may be unstable.

For example, the plurality of target states may include i) a first state in which the number of times the number of error bits occurring in an operation of reading data from the memory device 110 was equal to or greater than a first threshold error bit number during a first predetermined time period is equal to or greater than a first threshold number of times, ii) a second state in which the temperature of the memory device 110 is not within a preset temperature range, iii) a third state in which a number of times a sudden power-off (SPO) has occurred during a second predetermined time period is equal to or greater than a second threshold number of times, and iv) a fourth state in which a program status fail (PSF), an uncorrectable error correction code (UECC), or an erase status fail (ESF) has occurred.

The memory controller 120 may determine a target meta memory block on the basis of target states detected at the step S510 (S520).

For example, in order to determine a target meta memory block, the memory controller 120 may use the number of target states detected at the step S510.

In an embodiment of the disclosed technology, meta data written to the target meta memory block TGT_MBLK may include various types of data. For example, the meta data may include first meta data and second meta data. The memory controller 120 may store the first meta data and the second meta data in the same meta memory block or in different meta memory blocks on the basis of the target states.

Hereinafter, this will be described in detail with reference to FIG. 6.

Figure 6:
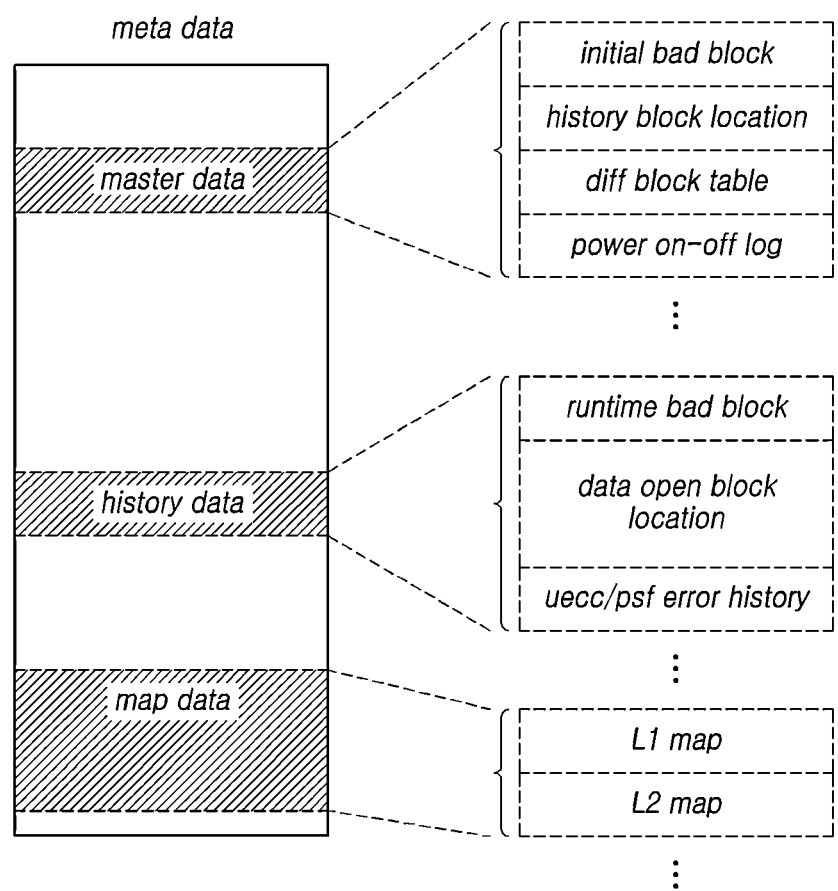
FIG. 6 illustrates an example of meta data according to an embodiment of the disclosed technology.

FIG. 6 illustrates an example of meta data according to an embodiment of the disclosed technology.

Referring to FIG. 6, meta data may include master data, history data and map data.

The master data is data which is used during a booting operation of the memory system 100. For example, the master data may include data for an initial bad block, data indicating a location where history data to be described below is stored, a table indicating that a usable portion of the initial bad block is used together with which other blocks, and log information on power-on and off.

The history data is system data which may be changed during a runtime. For example, the history data may include data for a runtime bad block, data indicating the location of an open memory block, and data for uncorrectable error correction code (UECC) and program status fail (PSF) error histories.

The map data is data which stores mapping information between logical addresses and physical addresses. Map data may be classified into different types depending on a granularity. For example, the map data may include first level (L1) map data and second level (L2) map data. The L1 map data may indicate mapping information on a wider address range than the L2 map data.

Figure 7:
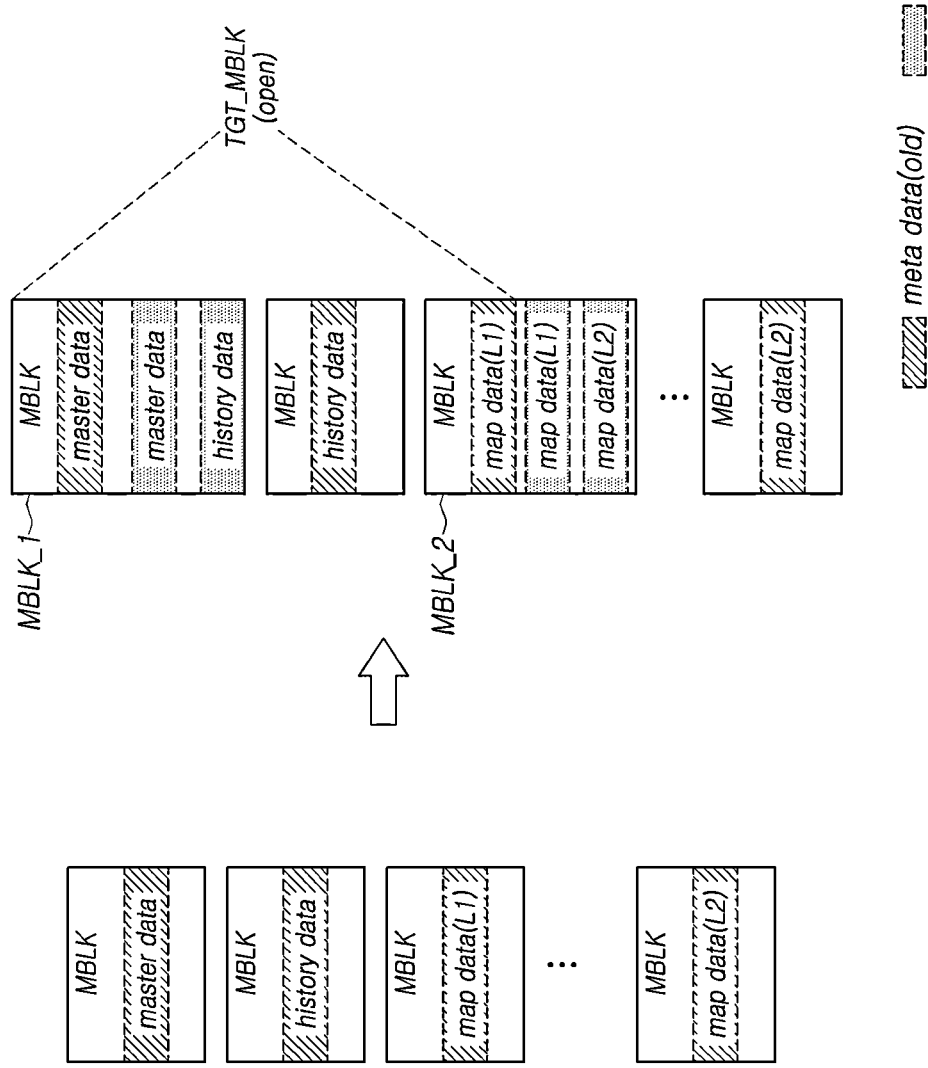
FIG. 7 illustrates an example of an operation in which a memory system determines a target meta memory block based on an embodiment of the disclosed technology.

FIG. 7 illustrates an example of an operation in which the memory system 100 determines a target meta memory block based on an embodiment of the disclosed technology.

Referring to FIG. 7, when a number of target states that are detected among the plurality of target states described above is equal to or greater than a first value VAL_1, the memory controller 120 of the memory system 100 may determine a first meta memory block MBLK_1 among the plurality of meta memory blocks MBLK as a target meta memory block in which the master data and the history data are to be stored, and may determine a second meta memory block MBLK_2 among the plurality of meta memory blocks MBLK as a target meta memory block in which the map data is to be stored.

For example, the first value VAL_1 may be 2. That is to say, when at least two target states are detected, the memory controller 120 may determine the first meta memory block MBLK_1 as a target meta memory block in which the master data and the history data are to be stored, and may determine the second meta memory block MBLK_2 as a target meta memory block in which the map data is to be stored.

Since the plurality of target states indicate that the operation of the memory device 110 may be unstable, the fact that the memory controller 120 has detected target states whose number is equal to or greater than the first value VAL_1 means that the instability of the memory device 110 may be high. As such, when the instability of the memory device 110 is high, the memory controller 120 may decrease the number of meta memory blocks to which meta data is to be written, thereby increasing the stability of meta data included in the memory device 110. This is because, as the number of meta memory blocks to which meta data is to be written increases, an error is more likely to occur in one of the meta memory blocks.

When target states whose number is less than the first value VAL_1 are detected among the plurality of target states for the predetermined time period set in advance, the memory controller 120 may store the master data and the history data in different meta memory blocks and may store the map data also in different meta memory blocks depending on a layer, as is generally known in the art.

Hereinafter, a detailed operation in which the memory controller 120 determines the first meta memory block MBLK_1 and the second meta memory block MBLK_2 will be described.

For example, the memory controller 120 may determine, among the plurality of meta memory blocks MBLK, a meta memory block in which master data has previously been stored (and in which the previously-stored master data may still be stored) or a meta memory block in which history data has previously been stored (and in which the previously-stored history data may still be stored), as the first meta memory block MBLK_1.

FIG. 7 illustrates, as an example, a case where a meta memory block in which master data has previously been stored is determined as the first meta memory block MBLK_1. However, in another case, a meta memory block in which history data has previously been stored may be determined as the first meta memory block MBLK_1.

In the illustrated case, new master data and new history data to be written to the memory device 110 are all written thereafter to the first meta memory block MBLK_1. Accordingly, in FIG. 7, new history data is no longer written to the meta memory block in which the history data has previously been stored.

However, in the illustrated embodiment of the disclosed technology, the previously stored history data is not migrated to another meta memory block.

For another example, the memory controller 120 may determine, among the plurality of meta memory blocks MBLK, a meta memory block in which L1 map data is previously stored or a meta memory block in which L2 map data is previously stored, as the second meta memory block MBLK_2.

FIG. 7 illustrates, as an example, a case where a meta memory block in which L1 map data has previously been stored (and in which the previously-stored L1 map data may still be stored) is determined as the second meta memory block MBLK_2. However, in another case, a meta memory block in which L2 map data has previously been stored (and in which the previously-stored L2 map data may still be stored) may be determined as the second meta memory block MBLK_2.

In the illustrated case, new L1 map data and new L2 map data to be written to the memory device 110 are all written thereafter to the second meta memory block MBLK_2. Accordingly, in FIG. 7, new L2 map data is no longer written to the meta memory block in which the L2 map data is previously stored.

However, in the embodiment of the disclosed technology, the previously stored L2 map data is not migrated to another meta memory block.

Figure 8:
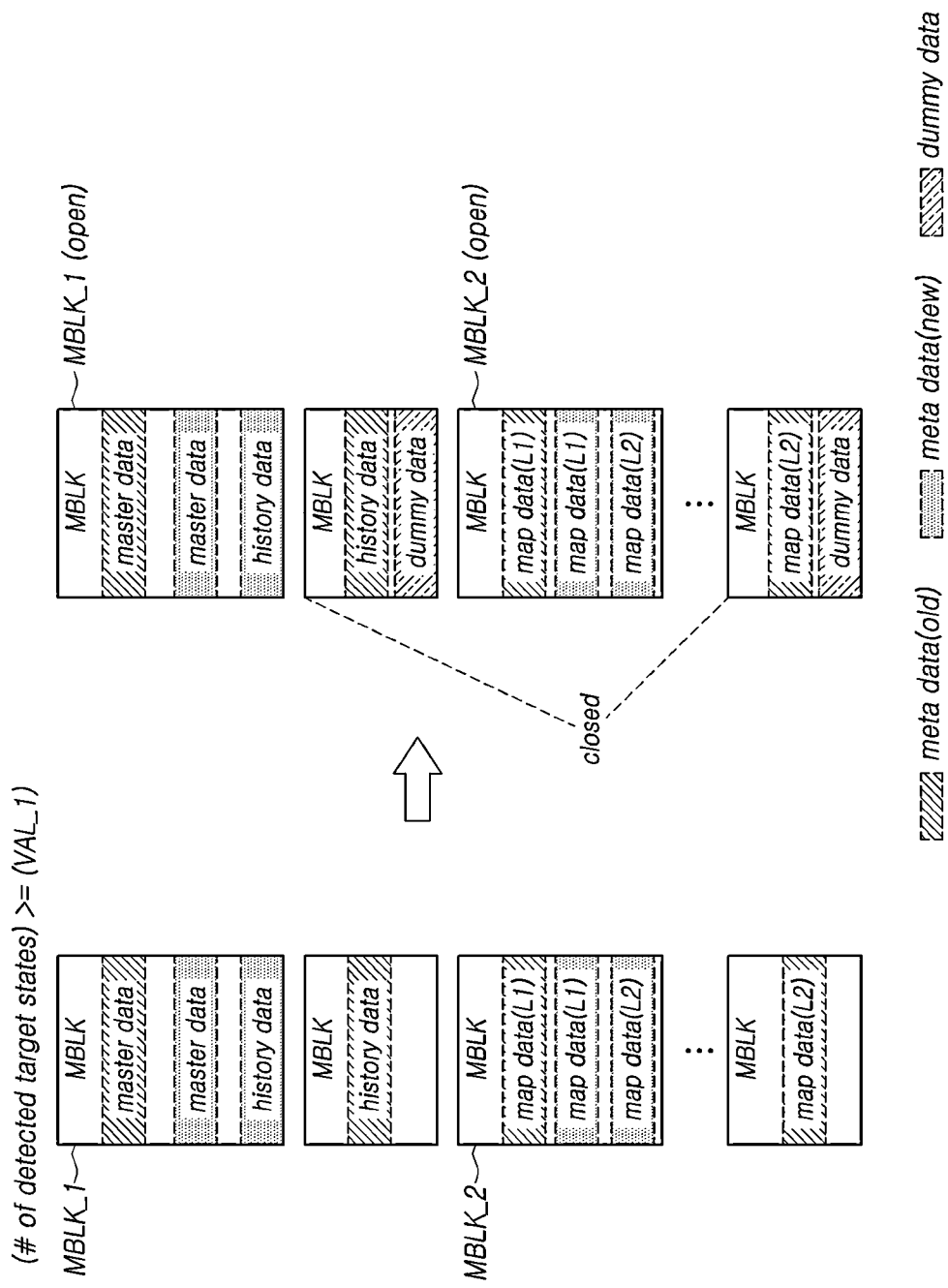
FIG. 8 illustrates an example of an operation in which the memory system of FIG. 7 sets some meta memory blocks to a closed state.

FIG. 8 illustrates an example of an operation in which the memory system 100 of FIG. 7 sets some meta memory blocks to a closed state.

Referring to FIG. 8, the memory controller 120 of the memory system 100 may set the other meta memory blocks except the first meta memory block MBLK_1 and the second meta memory block MBLK_2 among the plurality of meta memory blocks MBLK to a closed state.

Setting the other meta memory blocks to the closed state prevents an error from occurring in meta data previously stored in the other meta memory blocks due to an operation of writing new data to the other meta memory blocks, and secures the stability of the other meta memory blocks.

The memory controller 120 may set the other meta memory blocks to a closed state by writing dummy data to the meta memory blocks other than the first meta memory block MBLK_1 and the second meta memory block MBLK_2.

Figure 9:
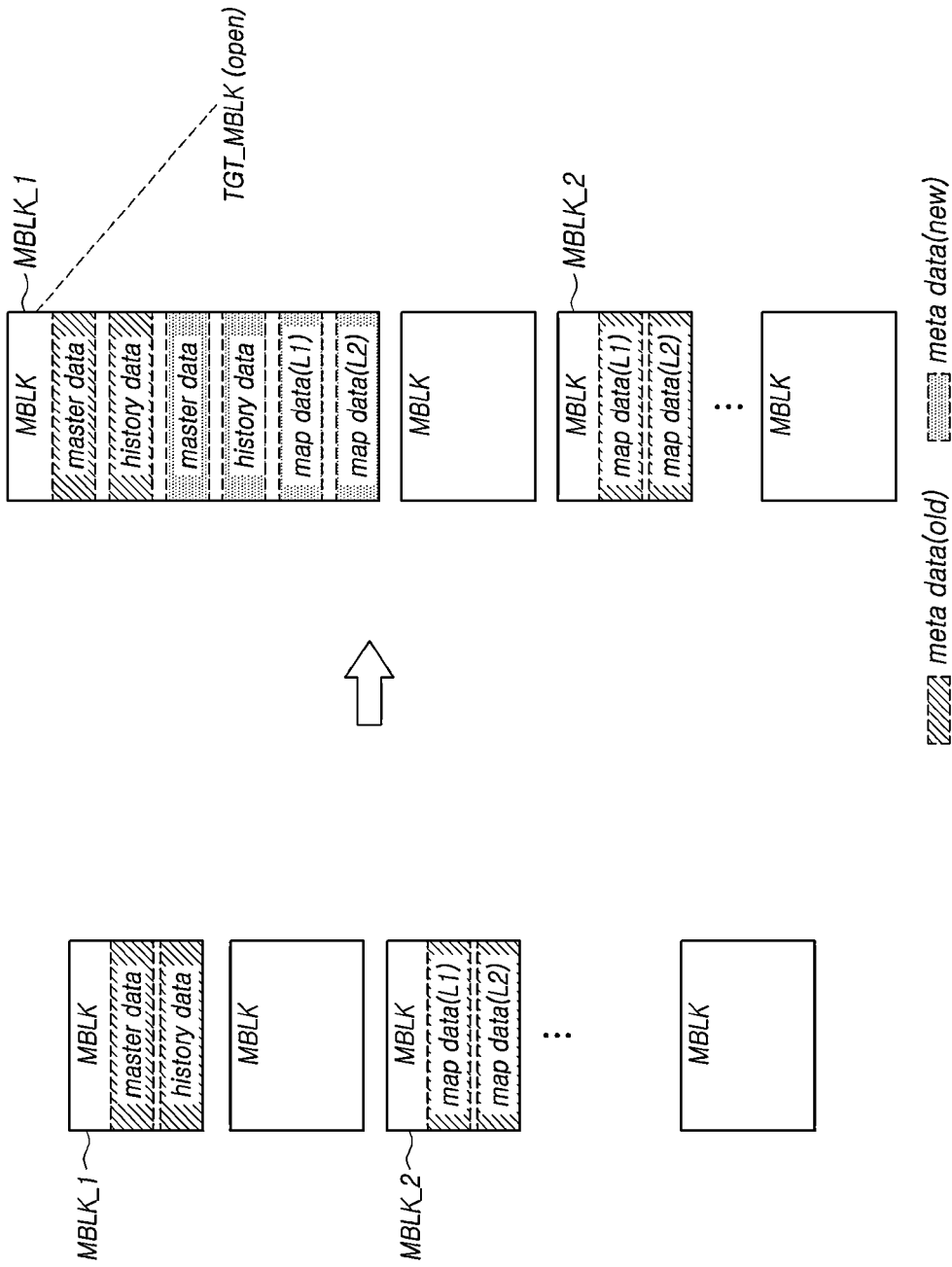
FIG. 9 illustrates an example of another operation in which a memory system determines a target meta memory block based on an embodiment of the disclosed technology.

FIG. 9 illustrates an example of another operation in which the memory system 100 determines a target meta memory block based on an embodiment of the disclosed technology.

Referring to FIG. 9, when target states whose number is equal to or greater than a second value VAL_2 are detected among the plurality of target states described above, the memory controller 120 of the memory system 100 may determine any one of the first meta memory block MBLK_1 and the second meta memory block MBLK_2 as a target meta memory block in which all meta data are to be stored.

The second value VAL_2 is greater than the first value VAL_1 described above with reference to FIG. 7. For example, when the first value VAL_1 is 2, the second value VAL_2 may be 3 or 4.

In this case, all new meta data (e.g., master data, history data and map data) to be written to the memory device 110 are written thereafter to the first meta memory block MBLK_1. Accordingly, in FIG. 9, new meta data is no longer written to the meta memory blocks other than the first meta memory block MBLK_1.

FIG. 9 illustrates, as an example, a case where the memory controller 120 determines the first meta memory block MBLK_1 as a target meta memory block in which all meta data are to be stored. However, in another case, the second meta memory block MBLK_2 may be determined as the target meta memory block in which all meta data are to be stored.

When target states whose number is equal to or greater than the first value VAL_1 and less than the second value VAL_2 are detected among the plurality of target states for the predetermined time period set in advance, the memory controller 120 may store the master data and the history data in the first meta memory block MBLK_1 and may store the map data in the second meta memory block MBLK_2, as described with reference to FIG. 7.

Figure 10:
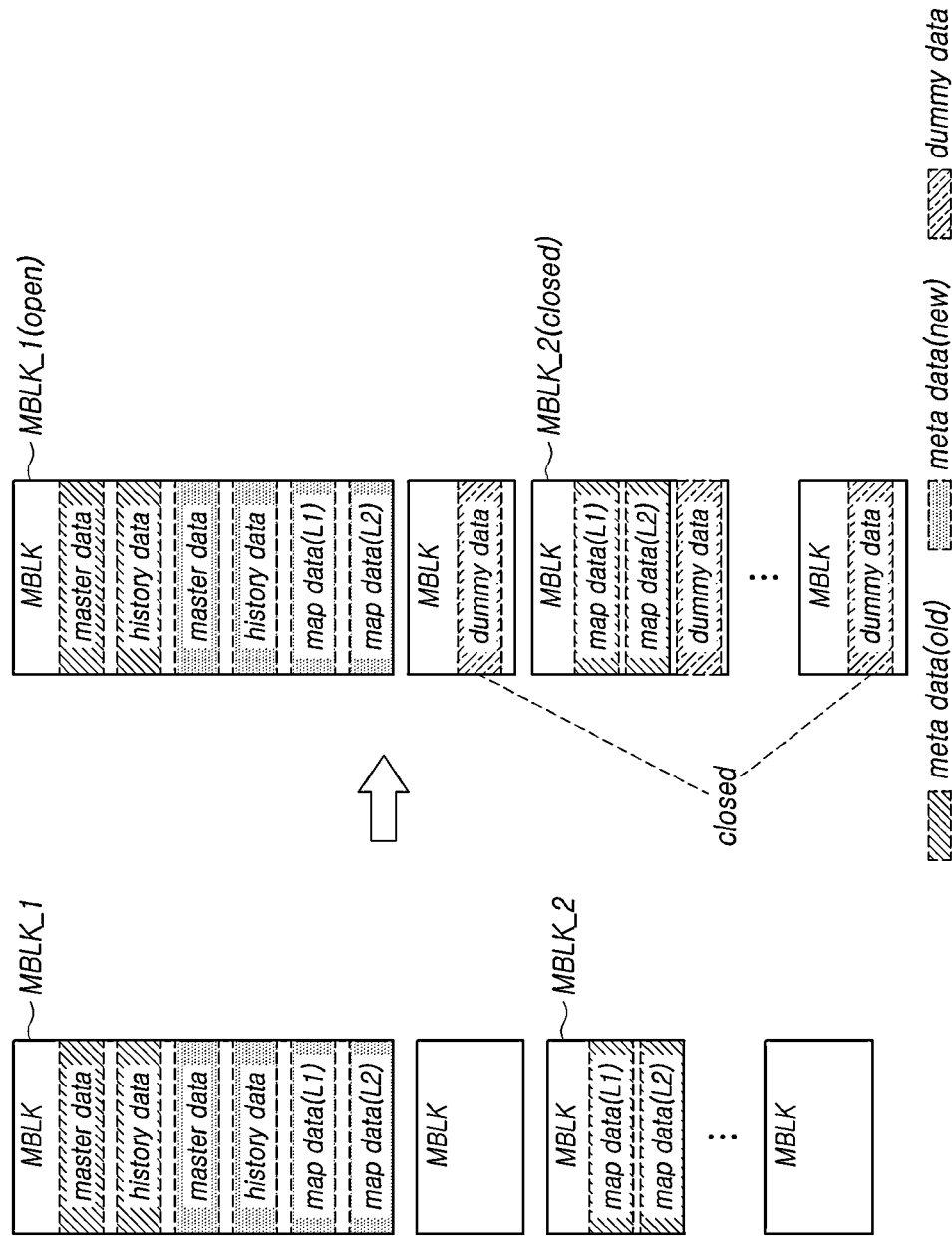
FIG. 10 illustrates an example of an operation in which the memory system of FIG. 9 sets some meta memory blocks to a closed state.

FIG. 10 illustrates an example of an operation in which the memory system 100 of FIG. 9 sets some of the meta memory blocks to a closed state.

Referring to FIG. 10, similarly to FIG. 8, the memory controller 120 of the memory system 100 may set a meta memory block not determined as a target meta memory block in which all meta data are to be stored, between the first meta memory block MBLK_1 and the second meta memory block MBLK_2, to a closed state.

In the case illustrated in FIG. 9, because the first meta memory block MBLK_1 is determined as a target meta memory block in which all meta data are to be stored, the memory controller 120 may set the second meta memory block MBLK_2 to a closed state.

Similarly to FIG. 8, the memory controller 120 may set the second meta memory block MBLK_2 to a closed state by writing dummy data to the second meta memory block MBLK_2.

Figure 11:
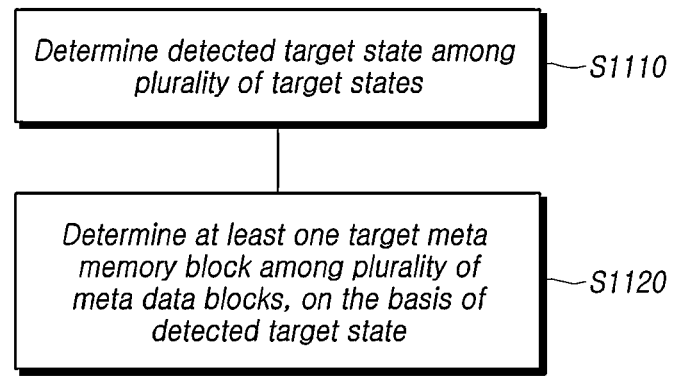
FIG. 11 illustrates a process for operating a memory system based on an embodiment of the disclosed technology.

FIG. 11 illustrates a process for operating the memory system 100 based on an embodiment of the disclosed technology.

Referring to FIG. 11, the process for operating the memory system 100 may include determining one or more detected target states among a plurality of target states set in advance (S1110).

For example, the plurality of target states may include i) a first state in which the number of times the number of error bits occurring in an operation of reading data from the memory device 110 was equal to or greater than a first threshold error bit number during a first predetermined time period is equal to or greater than a first threshold number of times, ii) a second state in which the temperature of the memory device 110 including the plurality of meta memory blocks MBLK is not within a preset temperature range, iii) a third state in which a number of times a sudden power-off (SPO) has occurred during a second predetermined time period is equal to or greater than a second threshold number of times, and iv) a fourth state in which a program status fail (PSF), an uncorrectable error correction code (UECC) or an erase status fail (ESF) has occurred.

The method for operating the memory system 100 may include determining at least one target meta memory block TGT_MBLK to which the entirety or a part of meta data is to be written, among the plurality of meta memory blocks MBLK, on the basis of target states detected at the step S1110 (S1120).

For example, meta data may include master data which is data used during a booting operation of the memory system 100, history data which is system data capable of being changed during a runtime, and map data which is data indicating mapping information between logical addresses and physical addresses.

The step S1120 may further include, when target states whose number is equal to or greater than a first value VAL_1 are detected among the plurality of target states, determining a first meta memory block MBLK_1 among the plurality of meta memory blocks MBLK as a target meta memory block in which a first portion of the meta data, such as the master data and the history data, are to be stored, and determining a second meta memory block MBLK_2 among the plurality of meta memory blocks MBLK as a target meta memory block in which a second portion of the meta data, such as the map data, is to be stored.

The step S1120 may further include setting the other meta memory blocks except the first meta memory block MBLK_1 and the second meta memory block MBLK_2 among the plurality of meta memory blocks MBLK to a closed state.

The step S1120 may further include, when target states whose number is equal to or greater than a second value VAL_2 among the plurality of target states are detected, determining any one of the first meta memory block MBLK_1 and the second meta memory block MBLK_2 as a target meta memory block in which all meta data are to be stored. The second value VAL_2 is greater than the first value VAL_1.

The step S1120 may further include setting a meta memory block not determined as a target meta memory block in which all meta data are to be stored, between the first meta memory block MBLK_1 and the second meta memory block MBLK_2, to a closed state.

Figure 12:
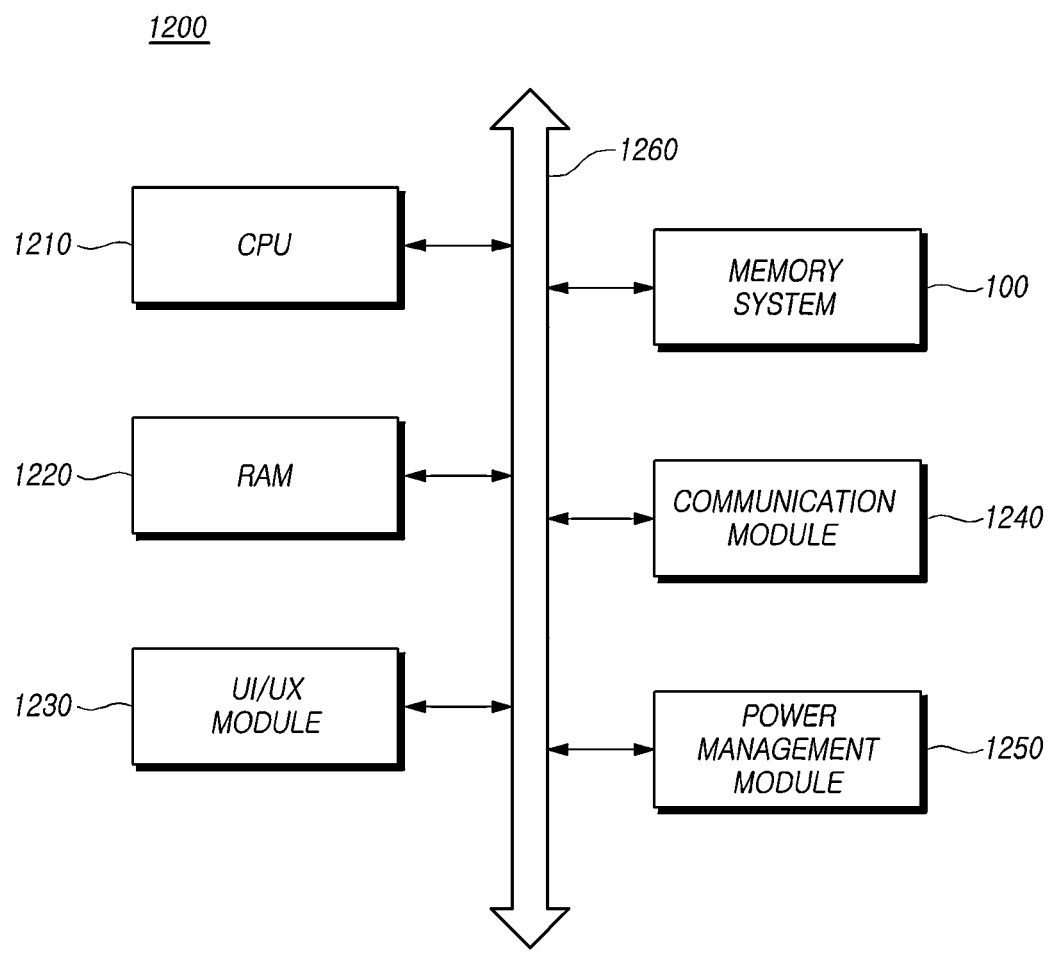
FIG. 12 illustrates a configuration of a computing system in accordance with embodiments of the disclosed technology.

FIG. 12 illustrates the configuration of a computing system 1200 according to an embodiment of the disclosed technology.

The computing system 1200 may include: a memory system 100 electrically connected to a system bus 1260; a CPU 1210 configured to control the overall operation of the computing system 1200; a RAM 1220 configured to store data and information related to operations of the computing system 1200; a user interface/user experience (UI/UX) module 1230 configured to provide the user with a user environment; a communication module 1240 configured to communicate with an external device of a wired and/or wireless type; and a power management module 1250 configured to manage power used by the computing system 1200.

The computing system 1200 may be a personal computer (PC) or may include a mobile terminal such as a smartphone, a tablet or various electronic devices.

The computing system 1200 may further include a battery for supplying an operating voltage, and may further include an application chipset, a graphic-related module, a camera image processor, a DRAM, and/or other elements known to a person skilled in the art.

The memory system 100 may include not only a device configured to store data in a magnetic disk such as a hard disk drive (HDD), but also a device configured to store data in a nonvolatile memory such as a solid state drive (SSD), a universal flash storage device, or an embedded MMC (eMMC) device. The non-volatile memory may include a read only memory (ROM), a programmable ROM (PROM), an electrically programmable ROM (EPROM), an electrically erasable and programmable ROM (EEPROM), a flash memory, a phase-change RAM (PRAM), a magnetic RAM (MRAM), a resistive RAM (RRAM), a ferroelectric RAM (FRAM), and the like. In addition, the memory system 100 may be implemented as storage devices of various types and mounted inside various electronic devices.

Although various embodiments of the disclosed technology have been described with particular specifics and varying details for illustrative purposes, those skilled in the art will appreciate that various modifications, additions and substitutions may be made based on what is disclosed or illustrated in the present disclosure without departing from the spirit and scope of the invention as defined in the following claims.

What is claimed is:

1. A memory system comprising:
    a memory device including a plurality of meta memory blocks to which meta data is permitted to be written; and
    a memory controller configured to determine, based on a number of detected target states among a plurality of target states indicating operation of the memory device may be unstable, at least one of the plurality of meta memory blocks as a target meta memory block to which an entirety or a part of types of the meta data is to be written,
    wherein when the number of detected target states among the plurality of target states is equal to or greater than a first value, the memory controller determines:
        a first meta memory block among the plurality of meta memory blocks as a first target meta memory block in which the metadata of a master data type and a history data type are to be stored, and
        a second meta memory block among the plurality of meta memory blocks as a second target meta memory block in which the metadata of a map data type is to be stored.

2. The memory system of claim 1, wherein the plurality of target states include:
    a first state corresponding to a first number of times, which is a number of times that respective numbers of error bits occurring in operations of reading data from the memory device during a first time period were equal to or greater than a first threshold error bit number, being equal to or greater than a first threshold number of times,
    a second state corresponding to a temperature of the memory device not being within a preset temperature range,
    a third state corresponding to a number of times a sudden power-off has occurred during a second time period being equal to or greater than a second threshold number of times, and
    a fourth state corresponding to an occurrence of a program status fail, an uncorrectable error correction code, an erase status fail, or a combination thereof.

3. The memory system of claim 1, wherein the types of the meta data includes:
    the master data type including data used during a booting operation of the memory system,
    the history data type including system data capable of being changed during a runtime, and
    the map data type indicating mapping information between logical addresses and physical addresses.

4. The memory system according to claim 3, wherein the map data type includes first level map data and second level map data.

5. The memory system according to claim 1, wherein when the number of detected target states is equal to or greater than the first value, the memory controller sets one or more meta memory blocks other than the first meta memory block and second meta memory block among the plurality of meta memory blocks to a closed state.

6. The memory system according to claim 1,
    wherein when the number of detected target states is equal to or greater than a second value, the memory controller determines a third meta memory block as the target meta memory block in which all meta data are to be stored, and
    wherein the second value is greater than the first value.

7. The memory system according to claim 6, wherein when the number of detected target states is equal to or greater than the second value, the memory controller sets a meta memory block not determined as the target meta memory block in which meta data are to be stored to a closed state.

8. A method for operating a memory system, comprising:
    determining a detected target state among a plurality of target states, indicating operation of the memory device may be unstable, set in advance; and
    determining at least one target meta memory block to which entirety or a part of types of meta data is to be written, among a plurality of meta memory blocks to which the meta data is permitted to be written, based on a number of detected target state,
    wherein determining the at least one target meta memory block comprises:
        when the number of detected target states among the plurality of target states is equal to or greater than a first value, determining:
            a first meta memory block among the plurality of meta memory blocks as a target meta memory block in which the metadata of a master data type and a history data type are to be stored, and
            a second meta memory block among the plurality of meta memory blocks as a target meta memory block in which the metadata of a map data type is to be stored.

9. The method according to claim 8, wherein the plurality of target states include:
    a first state corresponding to a first number of times, which is a number of times that respective numbers of error bits occurring in operations of reading data from the memory device during a first time period were equal to or greater than a first threshold error bit number, being equal to or greater than a first threshold number of times,
    a second state corresponding to a temperature of the memory device not being within a preset temperature range, a third state corresponding to a number of times a sudden power-off has occurred during a second time period being equal to or greater than a second threshold number of times, and a fourth state corresponding to an occurrence of a program status fail, an uncorrectable error correction code, an erase status fail, or a combination thereof.

10. The method according to claim 8, wherein the types of the meta data includes:

the master data type including data used during a booting operation of the memory system, the history data type including system data capable of being changed during a runtime, and the map data type indicating mapping information between logical addresses and physical addresses.

11. The method according to claim 10, wherein the map data type includes first level map data and second level map data.

12. The method according to claim 8, wherein determining that at least one target meta memory block further comprises:

when the number of detected target states is equal to or greater than the first value, setting one or more meta memory blocks other than the first meta memory block and second meta memory block among the plurality of meta memory blocks to a closed state.

13. The method according to claim 8, wherein determining the at least one target meta memory block comprises:

when the number of detected target states is equal to or greater than a second value, determining a third meta memory block as the target meta memory block in which all meta data are to be stored, wherein the second value is greater than the first value.

14. The method according to claim 13, wherein determining the at least one target meta memory block further comprises:

when the number of detected target states among the plurality of target states is equal to or greater than the second value, setting a meta memory block not determined as the target meta memory block in which meta data are to be stored to a closed state.

15. A memory controller comprising:

a memory interface capable of communicating with a memory device including a plurality of meta memory blocks to which meta data is permitted to be written; and a control circuit configured to determine, based on a number of detected target states among a plurality of target states which indicate operation of the memory device may be unstable, at least one of the plurality of meta memory blocks as a target meta memory block to which an entirety or a part of types of the meta data is to be written, wherein determining the at least one target meta memory block comprises:

when the number of detected target states among the plurality of target states is equal to or greater than a first value, determining:

a first meta memory block among the plurality of meta memory blocks as a target meta memory block in which the metadata of a master data type and a history data type are to be stored, and a second meta memory block among the plurality of meta memory blocks as a target meta memory block in which the metadata of a map data type is to be stored.

* * * * *